July 28, 1964   C. A. GRANT ETAL   3,142,437
PROTECTIVE COVER OR ENVELOPE
Filed Dec. 15, 1961   2 Sheets-Sheet 1
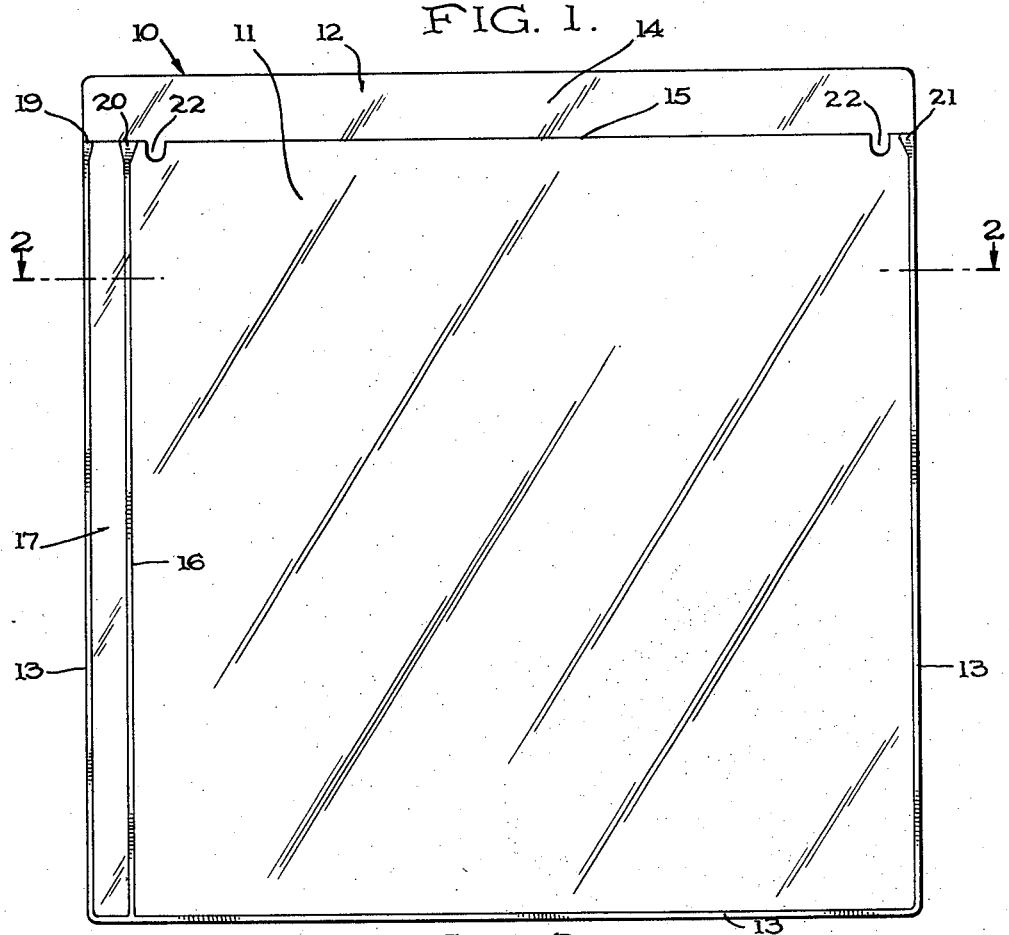
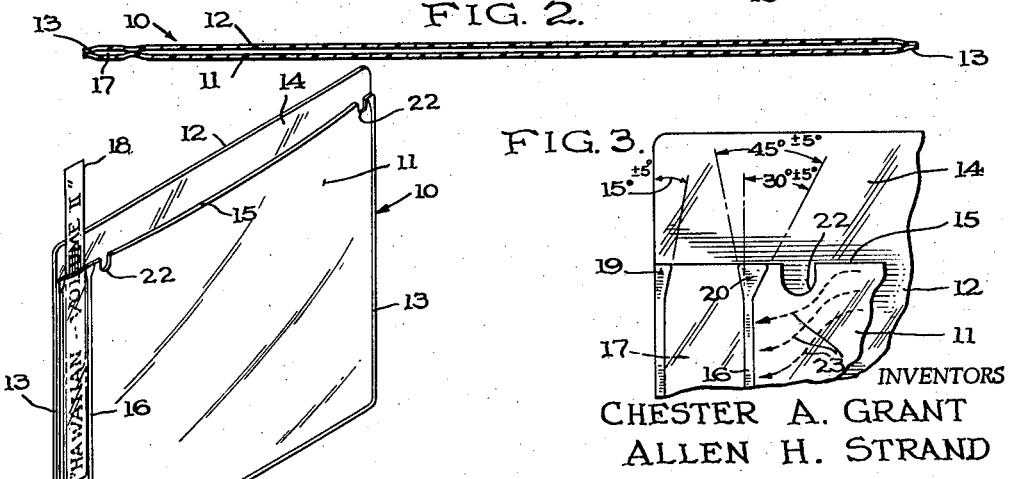
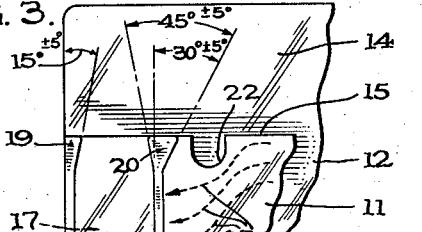
INVENTORS
CHESTER A. GRANT
ALLEN H. STRAND
BY
ATTORNEYS July 28, 1964    C. A. GRANT ETAL    3,142,437
PROTECTIVE COVER OR ENVELOPE
Filed Dec. 15, 1961    2 Sheets-Sheet 2
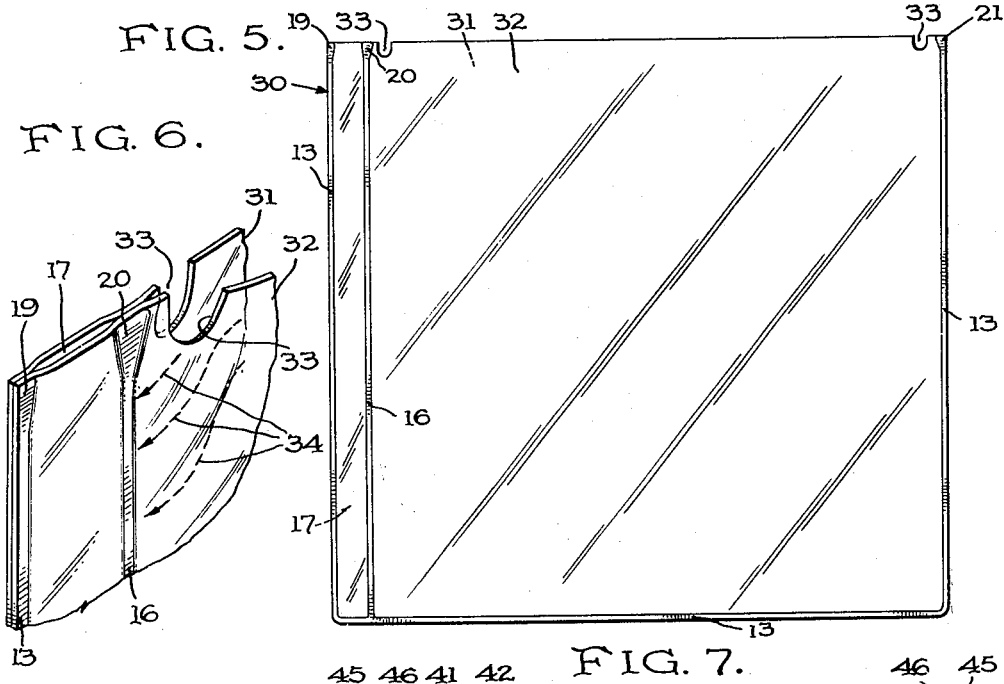
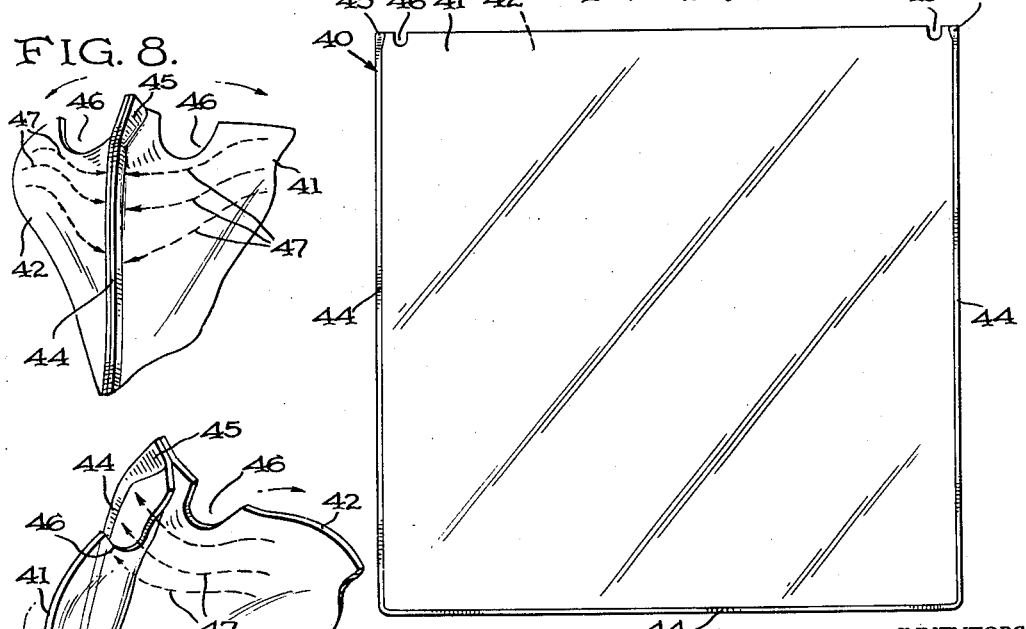
INVENTORS
CHESTER A. GRANT
ALLEN H. STRAND
BY
ATTORNEYS United States Patent Office 3,142,437
Patented July 28, 1964

3,142,437
PROTECTIVE COVER OR ENVELOPE
Chester A. Grant and Allen H. Strand, Syracuse, N.Y., assignors to Gaylord Bros., Inc., Syracuse, N.Y., a corporation of New York
Filed Dec. 15, 1961, Ser. No. 159,524
9 Claims. (Cl. 229—68)

The present invention relates broadly to adjoined sheet materials, and more particularly, to lightweight plastic flexible protective covers or envelopes having front and back panels joined together as by high frequency electronically sealed marginal edges defining an open mouth along one side thereof.

In recent years it has become a common practice to manufacture various articles formed of relatively lightweight plastic sheet material which have one or more of their superposed edges joined together by the use of electronic or other types of heat sealing means. However, when these joined sheet materials, such as plastic envelopes, are subjected to repeated or continual use, as when utilized to protect phonograph disc records, or documents, pictures or the like, it has been found that the sealed corner edges at the mouth of the envelope have a tendency to weaken under the repeated stresses and become torn or split apart at or closely adjacent to the sealed ends thereof.

Heretofore, attempts have been made to reduce the concentration of stress and thus reduce the likelihood of the seals becoming torn at or near their terminal portions, as by providing an enlarged sealed area at the terminal ends or corners of the sealed portions of the sheet materials. These enlarged sealed terminal areas are sometimes referred to as "blobs" in the trade, and generally help to strengthen the seal and to increase the useful life of the envelope. However, this attempt to solve the problem is not completely satisfactory as it, at best, only seems to temporarily arrest the tearing or splitting of the seals at the corners when subjected to hard usage.

Accordingly, it is a primary object of this invention to provide an improved tear-resistant electronic or otherwise heat-formed seal between plastic sheet materials which will overcome the foregoing disadvantage by decreasing the concentration of stress at the sealed corner ends by distributing it in other directions over a greater adjacent area.

More specifically, it is an object of this invention to provide an improved tear-resistant seal between superposed plastic sheets which are preferably continuously joined at least along one common edge thereof, by providing a notch having an arcuate base closely adjacent each terminal end of the seal in either one or both of the superposed sheets of plastic material.

Another object is to provide an article of manufacture embodying the notched stress-relieving feature according to the preceding objective, in which the opposite walls of the notch are generally parallel to the sealed area but are spaced slightly away therefrom to facilitate deploying of any imposed stresses away from the terminal end area per se of the seal and distribute it more at right angles thereto in a somewhat spreading pattern.

Still another object of this invention is to provide a plastic protective envelope having a pair of superposed face panels wherein one of the panels is appreciably longer than the other in the direction of its open side to better facilitate opening thereof, and embodying the stress-deploying notch feature according to the preceding objective, but only in the shorter face panel.

Still another objective is to provide a unitary envelope according to the next preceding objective but having a coplanar and considerably smaller auxiliary envelope or pocket laterally offset therefrom. This second envelope is elongated, open-ended and adaptable to removably receive an information bearing slip or tab element to more readily identify the contents which may be inserted within the larger main envelope.

These and other objects and advantages will become apparent to those skilled in the art from the following detailed description, taken in conjunction with the accompanying drawing figures which are illustrative of several practical embodiments, and the novel features thereof will be defined in the appended claims.

In the drawings:

FIG. 1 is a front elevational view of one embodiment of our improved plastic envelope having an elongated auxiliary pocket, and showing the stress deploying notches disposed only in the front panel of the main envelope;

FIG. 2 is a cross-sectional view as taken on line 2—2 of FIG. 1;

FIG. 3 is an enlarged fragmentary elevational detail view of the upper left corner area of the envelope depicted in FIG. 1, better showing the details of the terminal seal area of the envelope and the adjacently disposed stress-deploying notch;

FIG. 4 is a front perspective view of the envelope of FIG. 1 shown on a reduced scale, and showing an identification tab partially inserted in the auxiliary pocket thereof;

FIG. 5 is a front elevational view of a modified form of plastic envelope wherein the front and back panels are of the same size and have the stress-deploying notches disposed in alignment in both panels;

FIG. 6 is an enlarged fragmentary perspective detail view of the upper left hand corner of the envelope shown in FIG. 5, and showing the front panel in a slightly stressed condition to illustrate the function of the stress-deploying notch;

FIG. 7 is a front elevational view of a still further simplified form of plastic envelope embodying the stress-deploying notches also in both the front and back panels, but without the auxiliary pocket of the other forms;

FIG. 8 is an enlarged fragmentary exterior perspective detail view depicting arrows about the notched areas for representing stress lines as deployed when placing both the front and back panels under oppositely directed stress in the corner sealed area of the envelope; and FIG. 9 is an enlarged fragmentary exterior perspective detail view similar to FIG. 8, but as viewed from a direction opposite to that of FIG. 8.

Like reference characters designate corresponding parts throughout the figures of the drawings. Referring first to the embodiment illustrated in FIGS. 1-4, the envelope is preferably made of a lightweight transparent flexible plastic material and is generally designated 10. It comprises a front panel 11 superposed upon a back panel 12, with both panels being of generally rectangular form and having their marginal edges aligned and continuously sealed as at 13 along the side and bottom edges. In this form, the upper edges are not in alignment, and the back panel 12 is extended as at 14 somewhat above the upper edge of the front panel 11 along the mouth of the envelope. This arrangement facilitates easier opening of the envelope to permit the insertion or withdrawal of an article such as a phonograph record, picture, document or the like. An additional sealing seam 16 is disposed in relatively close, parallel spaced relation to one of the lateral edges of the envelope, thus forming a narrow, elongated auxiliary pocket 17 which is adapted to receive a strip element 18 (FIG. 4) bearing identification indicia or other information relating to the contents desired to be protected within the larger main envelope or pocket.

The terminal portions of the sealing seams 13 and 16 at the mouth of the envelope are enlarged as at 19, 20 and 21 to give added strength and to lessen the tear susceptibility of the corner areas of the envelope. These enlarged areas are sometimes referred to as "blobs" in the art, and FIG. 3 is illustrative of the "blob" details as used herein. The intermediate "blob" 20 is illustrated, in FIG. 3, as being divergingly angled in both directions from the sealing line portion 16 to define an included angle of approximately 45°±5°, with approximately 15° of this angle lying outwardly toward the auxiliary pocket 17 and being approximately equal to the opposed "blob" designated 19 which angles 15° inwardly from the opposite side of pocket 17. The "blob" 21 (see FIG. 1) is angled inwardly at approximately 30°±5° and corresponds substantially to the opposed 30° portion of "blob" 20.

Spaced inwardly but adjacent to the "blobs" 20 and 21, there are provided stress-deploying notches 22 having arcuate bases, said notches 22 being cut out of the free edge or lip 15 of the front panel 11. The width and depth of the notches 22 may vary according to the size of the main envelope, but preferably, the depth of the notch is substantially equal to the width thereof, and also preferably is substantially equal to the depth of the adjacent "blob" or reenforced areas of the seal line. The sides of the notches are preferably substantially parallel to each other and to the adjacent bonded or sealed seam 13 or 16. The arcuate bottom of each notch preferably is in the form of half of a circle having its diameter substantially equal to the length of the enlarged adjacent terminal seal or "blob," and also being substantially equal to the over-all depth of the notch, and the sides of each notch are preferably tangent to the circle aforesaid.

By incorporating the notches 22 in the manner described, the concentration of any imposed stress at the corner areas responsive to use of the envelope is significantly reduced and the stress is deployed away from the extreme corner of the seals per se, and is distributed over a much greater area and generally at right angles to the seal lines 13 and 16 as indicated by the dotted arrows 23 in FIG. 3.

Referring to the embodiment depicted in FIGS. 5 and 6, the envelope is generally designated 30 and is very similar to the first form described in the foregoing, except that the back panel 31 and the front panel 32 are of the same size, with the extended portion 14 of the back panel 12 of the first embodiment being omitted in this latter embodiment. In this latter embodiment, both the front and back panels 31 and 32 are provided with aligned notches 33 which also serve to deploy any imposed stress away from the extreme terminal portion or "blob" areas of the seal, and to more uniformly distribute it over a greater area downwardly and laterally about said notches 33 along the adjacent seal line. The stress deployment is illustrated in FIG. 6 by the dotted arrows 34. Inasmuch as the rest of the plastic envelope is the same as that of the first-described form, no further detailed description thereof is necessary.

A further simplified form of envelope is represented in FIGS. 7, 8 and 9, being generally designated at 40, and is substantially the same as the form of FIGS. 5 and 6, except that there is no auxiliary pocket provided in this third form. The envelope 40 comprises identical front and back panels 41 and 42, respectively, which are preferably continuously sealed along the side and bottom margins as at 44 by any suitable means, as by using conventional high-frequency electronic sealing means. The terminal portions of the seals are also preferably formed with "blobs" 45 similar to "blobs" 19 or 21 in the first-described embodiment and the envelope panels have notches 46 corresponding in function and shape to the notches 22 and 33 of the first and second described embodiments, respectively. FIGS. 8 and 9 show the stress deploying action at the corner seal areas produced by the notches 46 when the front and back panels 41 and 42 are subjected to strain or stress. The dotted arrows 47 depict the deployed stress lines as distributed along a considerably greater area of the sealed margin.

It is apparent from the foregoing that our improved stress deploying means as utilized in conjunction with protective flexible plastic envelopes fully achieves the objectives and advantages as set forth in the preamble hereof. However, it is to be understood our improved stress deploying means is not limited to protective envelope applications, but may be adapted to any folded or joined flexible sheet elements.

While the specific details have been herein shown and described, the invention is not limited thereto as various changes and alterations may be made without departing from the spirit and scope thereof as defined in the appended claims.

We claim:

1. A protective cover of the class described, comprising a pair of relatively flexible sheet plastic panels of generally rectangular form disposed in overlying relation to each other, certain of the marginal edges of the respective panels being disposed in register and bonded together, with the edges of the panels at one common end of the cover being unattached and defining a mouth to permit insertion of articles into and removal thereof from the cover, said mouth extending generally perpendicular to one terminal end of the bonded edges of the panels, and at least one of the panels having a strain diverging and deploying notch provided in its free edge at the mouth aforesaid adjacent to but laterally spaced from the bonded panel edges, said notch being extended inwardly of the mouth from the free edge of the latter panel and being of such depth as to substantially reduce strains on the terminal end of the bond at the mouth of the cover when the protective cover is in use, the edges of the respective panels being registered along three sides and being bonded along a continuous line of substantially uniform width except at its extreme ends, said bond line terminating at the opposite corners of the fourth side to define an envelope which is open along the latter side, with a corresponding notch being provided in at least one panel adjacent to each terminal end of the bond line, and each terminal end of the bond line being laterally enlarged in the zone of the envelope mouth.

2. A protective cover of the class described, comprising a pair of relatively flexible sheet plastic panels of generally rectangular form disposed in overlying relation to each other, certain of the marginal edges of the respective panels being disposed in register and bonded together, with the edges of the panels at one common end of the cover being unattached and defining a mouth to permit insertion of articles into and removal thereof from the cover, said mouth extending generally perpendicular to one terminal end of the bonded edges of the panels, and at least one of the panels having a strain diverging and deploying notch provided in its free edge at the mouth aforesaid adjacent to but laterally spaced from the bonded panel edges, said notch being extended inwardly of the mouth from the free edge of the latter panel and being of such depth as to substantially reduce strains on the terminal end of the bond at the mouth of the cover when the protective cover is in use, the edges of the respective panels being registered along three sides and being bonded along a continuous line terminating at the opposite corners of the fourth side to define an envelope which is open along the latter side, with a corresponding notch being provided in at least one panel adjacent to each terminal end of the bond line, and each terminal end of the bond line being enlarged in the zone of the envelope mouth, with the enlarged bonded areas diverging toward the mouth.

3. A protective cover of the class described, comprising a pair of relatively flexible sheet plastic panels of generally rectangular form disposed in overlying relation to each other, the marginal edges of the respective panels being disposed in register along three sides and being bonded together along a continuous line terminating at the opposite corners of the fourth side, with the edges of the panels at one common end of the cover being unattached and defining a mouth to permit insertion of articles into and removal thereof from the cover, said mouth extending generally perpendicular to one terminal end of the bonded edges of the panels, and each of the panels having a strain diverging and deploying notch provided in its free edge at the mouth aforesaid adjacent to but laterally spaced from the bonded panel edges, said notch being extended inwardly of the mouth from the free edge of the latter panels and being of such depth as to substantially reduce strains on the terminal ends of the bond at the mouth of the cover when the protective cover is in use, both panels being extended laterally beyond the bond line at one side of the envelope, with the extreme edges of the panel extensions being in register and bonded together along two sides to define an auxiliary pocket having an open mouth at one side, and with the strain diverging and deploying notches being formed in the free edges of both extended panels.

4. A protective cover of the class described, comprising a pair of relatively flexible sheet plastic panels of generally rectangular form disposed in overlying relation to each other, the marginal edges of the respective panels being disposed in register along three sides and being bonded together along a continuous line terminating at the opposite corners of the fourth side, with the edges of the panels at one common end of the cover being unattached and defining a mouth to permit insertion of articles into and removal thereof from the cover, said mouth extending generally perpendicular to one terminal end of the bonded edges of the panels, and each of the panels having a strain diverging and deploying notch provided in its free edge at the mouth aforesaid adjacent to but laterally spaced from the bonded panel edges, said notch being extended inwardly of the mouth from the free edge of the latter panels and being of such depth as to substantially reduce strains on the terminal ends of the bond at the mouth of the cover when the protective cover is in use, both panels being extended laterally beyond the bond line at one side of the envelope, with the extreme edges of the panel extensions being in register and bonded together along two sides to define an auxiliary pocket having an open mouth in general alignment with the other mouth of the envelope.

5. A protective envelope of the class described, comprising a pair of relatively flexible plastic panels of generally rectangular form disposed in overlying relation to each other, the marginal edges of said panels being registered along three sides and bonded together along a continuous line terminating at the opposite corners of the fourth side, the edges of the panels at said fourth side being freely separable to define the mouth of the envelope, and the panels being further bonded together along a line parallel to but spaced inwardly from one of the bonded side lines which terminates at the mouth of the envelope to define an auxiliary pocket along one side of the envelope and having an open mouth substantially aligned with the mouth of the envelope aforesaid, and means adjacent to but laterally spaced from the terminal ends of the bond lines at one side of the auxiliary pocket for relieving the terminal bond areas from stresses imposed on the mouth of the envelope when in use, said means comprising a notch provided in at least one of the envelope panels and extended inwardly from the mouth edge of the panel adjacent to the terminal ends of the last-mentioned bond lines.

6. A protective envelope of the class described, comprising a pair of relatively flexible plastic panels of generally rectangular form disposed in overlying relation to each other, the marginal edges of said panels being registered along three sides and bonded together along a continuous line terminating at the opposite corners of the fourth side, the edges of the panels at said fourth side being freely separable to define the mouth of the envelope, and the panels being further bonded together along a line parallel to but spaced inwardly from one of the bonded side lines which terminates at the mouth of the envelope to define an auxiliary pocket along one side of the envelope and having an open mouth substantially aligned with the mouth of the envelope aforesaid, and means adjacent to but laterally spaced from the terminal ends of the bond lines at one side of the auxiliary pocket for relieving the terminal bond areas from stresses imposed on the mouth of the envelope when in use, said means comprising a generally U-shaped notch provided in at least one of the envelope panels and extended inwardly from the mouth edge of the panel adjacent to the terminal ends of the last-mentioned bond lines.

7. A protective envelope of the class described, comprising a pair of relatively flexible plastic panels of generally rectangular form disposed in overlying relation to each other, the marginal edges of said panels being registered along three sides and bonded together along a continuous line terminating at the opposite corners of the fourth side, the edges of the panels at said fourth side being freely separable to define the mouth of the envelope, and the panels being further bonded together along a line parallel to but spaced inwardly from one of the bonded side lines which terminates at the mouth of the envelope to define an auxiliary pocket along one side of the envelope and having an open mouth substantially aligned with the mouth of the envelope aforesaid, and means adjacent to but laterally spaced from the terminal ends of the bond lines at one side of the auxiliary pocket for relieving the terminal bond areas from stresses imposed on the mouth of the envelope when in use, said means comprising a generally U-shaped notch provided in at least one of the envelope panels and extended inwardly from the mouth edge of the panel adjacent to the terminal ends of the last-mentioned bond lines, the base of each notch being a semi-circle having a diameter substantially equal to the over-all depth of the notch.

8. A protective envelope of the class described, comprising a pair of relatively flexible plastic panels of generally rectangular form disposed in overlying relation to each other, the marginal edges of said panels being registered along three sides and bonded together along a continuous line terminating at the opposite corners of the fourth side, the edges of the panels at said fourth side being freely separable to define the mouth of the envelope, and the panels being further bonded together along a line parallel to but spaced inwardly from one of the bonded side lines which terminates at the mouth of the envelope to define an auxiliary pocket along one side of the envelope and having an open mouth substantially aligned with the mouth of the envelope aforesaid, and means adjacent to but laterally spaced from the terminal ends of the bond lines at one side of the auxiliary pocket for relieving the terminal bond areas from stresses imposed on the mouth of the envelope when in use, said means comprising a generally U-shaped notch provided in at least one of the envelope panels and extended inwardly from the mouth edge of the panel adjacent to the terminal ends of the last-mentioned bond lines, the base of each notch being a semi-circle having a diameter substantially equal to the over-all depth of the notch, and the sides of each notch being substantially parallel to each other and subtantially parallel to the adjacent bond line.

9. A protective envelope of the class described, comprising a pair of relatively flexible plastic panels of generally rectangular form disposed in overlying relation to each other, the marginal edges of said panels being registered along three sides and bonded together along a continuous line terminating at the opposite corners of the fourth side, the edges of the panels at said fourth side being freely separable to define the mouth of the envelope, and the panels being further bonded together along a line parallel to but spaced inwardly from one of the bonded side lines which terminates at the mouth of the envelope to define an auxiliary pocket along one side of the envelope and having an open mouth substantially aligned with the mouth of the envelope aforesaid, and means adjacent to but laterally spaced from the terminal ends of the bond lines at one side of the auxiliary pocket for relieving the terminal bond areas from stresses imposed on the mouth of the envelope when in use, said means comprising a generally U-shaped notch provided in at least one of the envelope panels and extended inwardly from the mouth edge of the panel adjacent to the terminal ends of the last-mentioned bond lines, the base of each notch being a semi-circle having a diameter substantially equal to the over-all depth of the notch, and the sides of each notch being substantially parallel to each other and substantially parallel to the adjacent bond line, with the sides of each notch also being tangent to the circle of which the base of the notch is a semi-circle.

References Cited in the file of this patent

UNITED STATES PATENTS

| | | |
|---|---|---|
| 2,085,766 | Potdevin et al. | July 6, 1937 |
| 2,141,752 | Hoarle | Dec. 27, 1938 |
| 2,298,421 | Salfisberg | Oct. 13, 1942 |
| 2,718,911 | Solomon | Sept. 29, 1955 |
| 2,777,574 | Brody | Jan. 15, 1957 |
| 2,805,973 | Klasing et al. | Sept. 10, 1957 |
| 2,990,101 | Mead et al. | June 27, 1961 |